United States Patent [19]

Jippo et al.

[11] Patent Number: 5,280,606
[45] Date of Patent: Jan. 18, 1994

[54] FAULT RECOVERY PROCESSING FOR SUPERCOMPUTER

[75] Inventors: Akira Jippo, Tokyo; Akihiko Nakamura, Koufu, both of Japan

[73] Assignee: NEC Corporation, Tokyo, Japan

[21] Appl. No.: 665,955

[22] Filed: Mar. 8, 1991

[30] Foreign Application Priority Data

Mar. 8, 1990 [JP] Japan ............................ 2-58619

[51] Int. Cl.$^5$ ............................................ G06F 11/00
[52] U.S. Cl. ................................ 395/575; 364/268.9; 364/285.3; 364/DIG. 1
[58] Field of Search ...................... 371/11.3, 12, 16.1; 395/575; 364/268.9, 285.3

[56] References Cited

U.S. PATENT DOCUMENTS

| | | | |
|---|---|---|---|
| 4,839,895 | 6/1989 | Makita | 371/11.3 |
| 4,970,640 | 11/1990 | Beardsley et al. | 364/200 |
| 5,020,059 | 5/1991 | Gorin et al. | 371/11.3 |

*Primary Examiner*—Charles E. Atkinson
*Attorney, Agent, or Firm*—Foley & Lardner

[57] ABSTRACT

In a high speed computer having a memory and a plurality of arithmetic processors divided into groups, the arithmetic processors of each group being connected to the memory in a hierarchical order in a master-subordinate relationship, the memory and the arithmetic processors generates an alarm signal indicating a failed part of the memory and each of the arithmetic processors. During a fault recovery process, a test program is performed on the computer to determine if it is properly functioning. If a favorable result is indicated, the computer is restarted in an original system configuration. Otherwise, part of the arithmetic processors is isolated from the computer depending on the alarm signal to degrade the computer into a first degraded system configuration. The test program is performed again on the first degraded system configuration. If the second test produces a favorable result, the computer is restarted in the first degraded system configuration. Otherwise, one or more of the arithmetic processors are isolated from the computer depending on the alarm signal so that the computer is degraded into a second degraded system configuration.

5 Claims, 10 Drawing Sheets

FIG. 4
TRANSLATION TABLE

| ERROR LOG DATA | | | | | | | ASSIGNED CODE | | | | | | |
|---|---|---|---|---|---|---|---|---|---|---|---|---|---|
| VECTOR PIPELINE SETS | | | | | | | VECTOR PIPELINE SETS | | | | | | |
| SET 24 | SET 25 | SET 26 | SET 27 | | | | SET 24 | SET 25 | SET 26 | SET 27 | | | |
| 0 | 0 | 0 | 0 | | | | 0 | 0 | 0 | 0 | | | |
| 1 | 0 | 0 | 0 | | | | 1 | 1 | 0 | 0 | | | |
| 0 | 1 | 0 | 0 | | | | 1 | 1 | 0 | 0 | | | |
| 0 | 0 | 1 | 0 | | | | 0 | 0 | 1 | 1 | | | |
| 0 | 0 | 0 | 1 | | | | 0 | 0 | 1 | 1 | | | |

LEGEND:

0 : PROPERLY FUNCTIONING, OR VALID
1 : FAULTY, OR INVALID

FIG. 5

FAULT RECOVERY PROCESSING FOR SUPERCOMPUTER

BACKGROUND OF THE INVENTION

The present invention relates to failure recovery processing for data processing system and more specifically to failure recovery processing for supercomputers such as vector pipeline processors.

Supercomputers are capable of processing data at speeds one order of magnitude higher than the speed of operation of general purpose computers and have been widely used for scientific calculations for research and development projects. Supercomputers are usually implemented with two basic considerations. One is a technique for reducing the processing time for a given amount of input data. This is specifically accomplished by shortening the clock cycle. The clock cycle of supercomputers has been reduced year by year in comparison with general purpose computers, and a recent version of supercomputer is able to provide as many as sixteen 64-bit registers for executing floating point calculations at 2.9-nanosecond clock intervals. The speed of this value is one order of magnitude higher than the speed of general purpose computers.

The second consideration relates to the reduction of the amount of access to the main memory. Since a large volume of data are handled by supercomputers during each process, frequency accesses to the main memory impose limitations on the operating performance of the supercomputer. To this end, registers are provided in massive quantities to store data to which the access time can be reduced significantly in comparison with that taken to access the main memory. For efficient utilization of such registers, they are made to act as "software visible" registers which can be programmed.

Since the supercomputer has a small machine cycle and a massive quantity of software data, it is impractical to hold data stored in the software visible registers to effect instruction retry and processor relief actions in a manner similar to the fault recovery procedure taken by general-purpose computers. Therefore, a failure in any part of the supercomputer might result in a total system breakdown, causing all jobs in progress as well as succeeding jobs to be aborted.

SUMMARY OF THE INVENTION

It is therefore an object of the present invention to provide a fault recovery method and processor for high speed computers which minimizes the system downtime.

In a high speed computer having a memory and a plurality of arithmetic processors divided into groups, the arithmetic processors of each group being connected to the memory in hierarchical order in a master-subordinate relationship, the memory and the arithmetic processors generating an alarm signal indicating a failed part of the memory and each of the arithmetic processors. The alarm signal is analyzed to determined if the computer is in a possibly recoverable state. If the computer is in recoverable state, a test program is performed on it to determine if it is properly functioning. If the test program indicates that the computer is properly functioning, it is restarted in an original system configuration. Otherwise, part of the arithmetic processors is isolated from the computer depending on the alarm signal to degrade the computer into a first degraded system configuration. The test program is again performed on the computer in the first degraded system configuration. If the result of the second test indicates that the computer is properly functioning, it is restarted in the first degraded system configuration. Otherwise, one or more of the arithmetic processors are isolated from the computer depending on the alarm signal so that the computer is degraded into a second degraded system configuration to allow the computer to be restarted in the second degraded system configuration.

In a preferred form of the present invention, each of the arithmetic processors includes a plurality of vector pipelines, and a valid/invalid code is assigned to each of the arithmetic processors depending on a result of the test program, the valid/invalid code identifying each of the arithmetic processors of each group as connectable to the computer or disconnectable from the computer. A total number of vector pipelines available for one group of the arithmetic processors is compared with a total number of vector pipelines available for the other group of the arithmetic processors. The valid/invalid code assigned to the master arithmetic processor of the group is selected if this group has a greater number of available vector pipelines. The valid/invalid code assigned to each of the arithmetic processors is checked against the selected valid/invalid code to determine whether the vector pipelines of each of the arithmetic processors are to be isolated from the computer or each of the arithmetic processors is to be isolated as a whole from the computer.

BRIEF DESCRIPTION OF THE DRAWINGS

The present invention will be described in further detail with reference to the accompanying drawings, in which.

DETAILED DESCRIPTION

Figure 1:
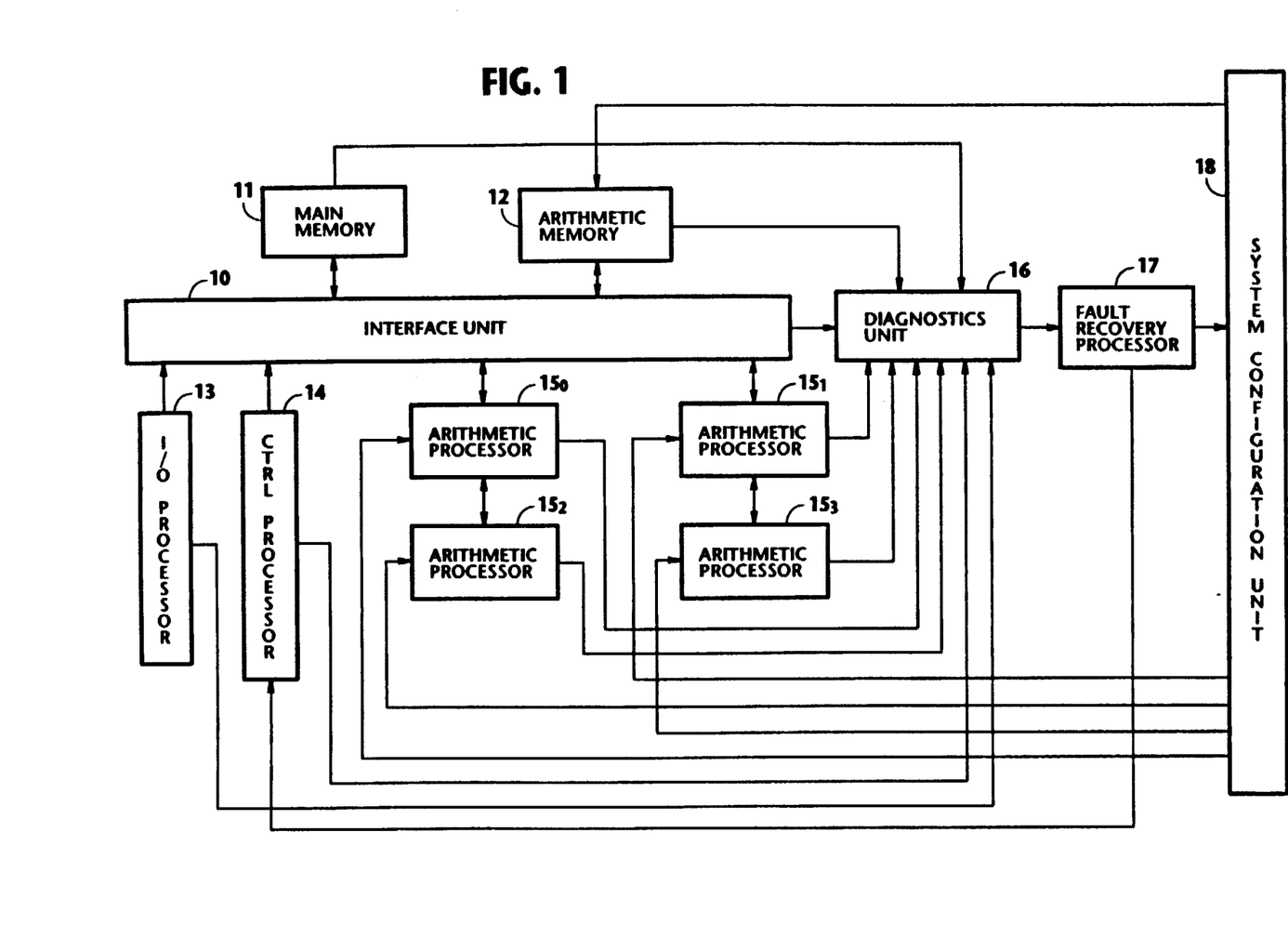
FIG. 1 shows in block form a pipeline computer incorporating a fault recovery processor of the present invention.

Referring now to FIG. 1, there is shown a pipeline computer incorporating the fault recovery processor of the present invention. The pipeline computer comprises an input/output processor 13 for controlling the peripheral units of the system and a control processor 14 which provides overall control of the system by executing the OS (operating system) programs and control data stored in a main memory 11 and reconfiguring the OS in response to a system reconfiguration signal supplied from a fault recovery processor 17. In addition, control processor 14 also functions as a supervisor for compiling and linking user programs. A plurality of high-speed arithmetic processors 15 are provided which are grouped into even-numbered units $15_{2i}$ and odd-numbered units $15_{2i+1}$ (where $i = 0, 1, 2 \ldots$). For purposes of simplicity, each of the even-numbered and odd-numbered groups is shown as having only two arithmetic processors. In each group, the arithmetic processors are connected to an interface unit (or system controller) 10 such that the processor 15 identified with numeral having a subscript of least value acts as a master and the other processor of the group is subordinate to it. In the illustrated embodiment, processors $15_0$ and $15_1$ are the master processors and processors $15_2$ and $15_3$ are the subordinate processors. Each arithmetic processor is associated with an arithmetic memory 12 through interface unit 10 to execute arithmetic/logic programs and data, and user programs stored in memory 12. Arithmetic memory 12 is partitioned into eight memory units which can be individually diagnosed and identified in the event of a failure.

A diagnostics unit 16 is provided to receive alarm signals from interface unit 10, main memory 11, arithmetic memory 12, from I/O processor 13, control processor 14, and arithmetic processors $15_0$ through $15_3$. The alarm signal is analyzed to identify faulty parts of the warning unit. The result of the diagnostic analysis is communicated to fault recovery processor 17 in which it is recorded as error log data. Fault recovery processor 17 generates a system reconfiguration signal identifying a faulty part which can be disconnected from the system if it can be "degradable", or operated at reduced levels of service in a manner as will be described in detail later. The system reconfiguration signal is supplied to control processor 14 for reconfiguring the OS program, and to a system configuration unit 18 for degrading arithmetic memory 12 and arithmetic processors $15_0 \sim 15_3$.

Figure 2:
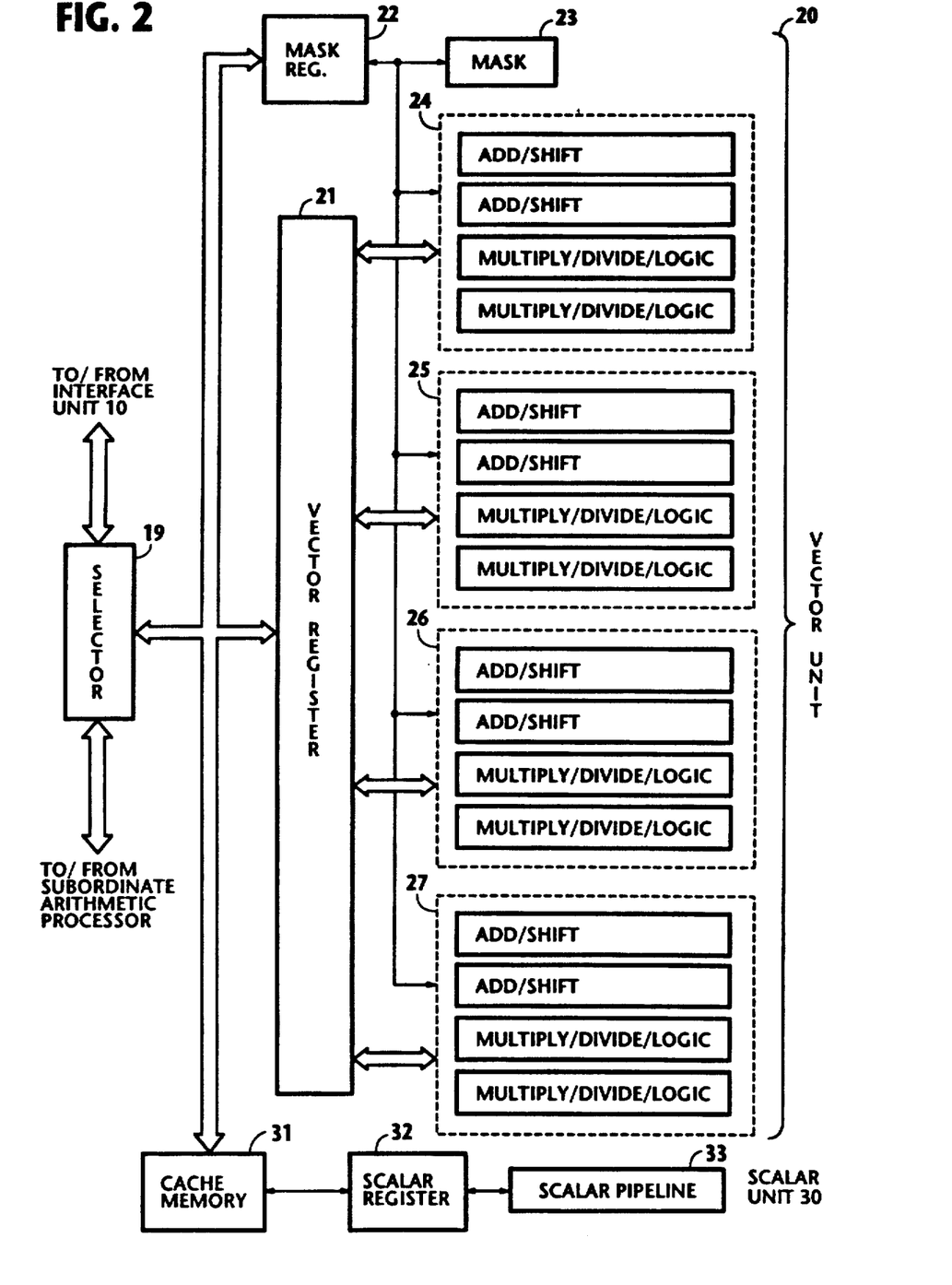
FIG. 2 shows details of a master arithmetic processor of FIG. 1.

In FIG. 2, the master arithmetic processor of each group generally comprises a vector unit 20 and a scalar unit 30 which are connected through a selector 19 to interface unit 10. The slave processor is connected to selector 19 so that it is subordinate to the master processor in a hierarchical order. Vector unit 40 is formed by a mask register 22, a mask execution unit 23 coupled to register 22, a vector register unit 21, a plurality of vector arithmetic pipelines divided into four groups 24, 25, 26, 27, each comprising two add/shift units and two multiply/divide/logic units. Scalar unit 30 comprises scalar registers 32, a 64-kilobyte, two-level cache memory 31, and a scalar pipeline 33 which provides scalar add/subtract, logic, shift and divide/multiply functions.

The system is configured with system generation parameters, which also specify which modes the fault recovery processor should perform. Six modes are available, i.e., test program execution mode, AM (arithmetic memory)/VP (vector pipeline) degrade mode, VP-degrade mode, cache-degrade mode, AM-degrade mode and auto-restart mode. Any of these modes are combined appropriately to meet user's needs and the modes to be performed are specified by the system generation parameters.

Fault recovery processor 17 is programmed to execute the fault recovery routine of the present invention as shown in FIGS. 3A to 3F.

Figure 3A:
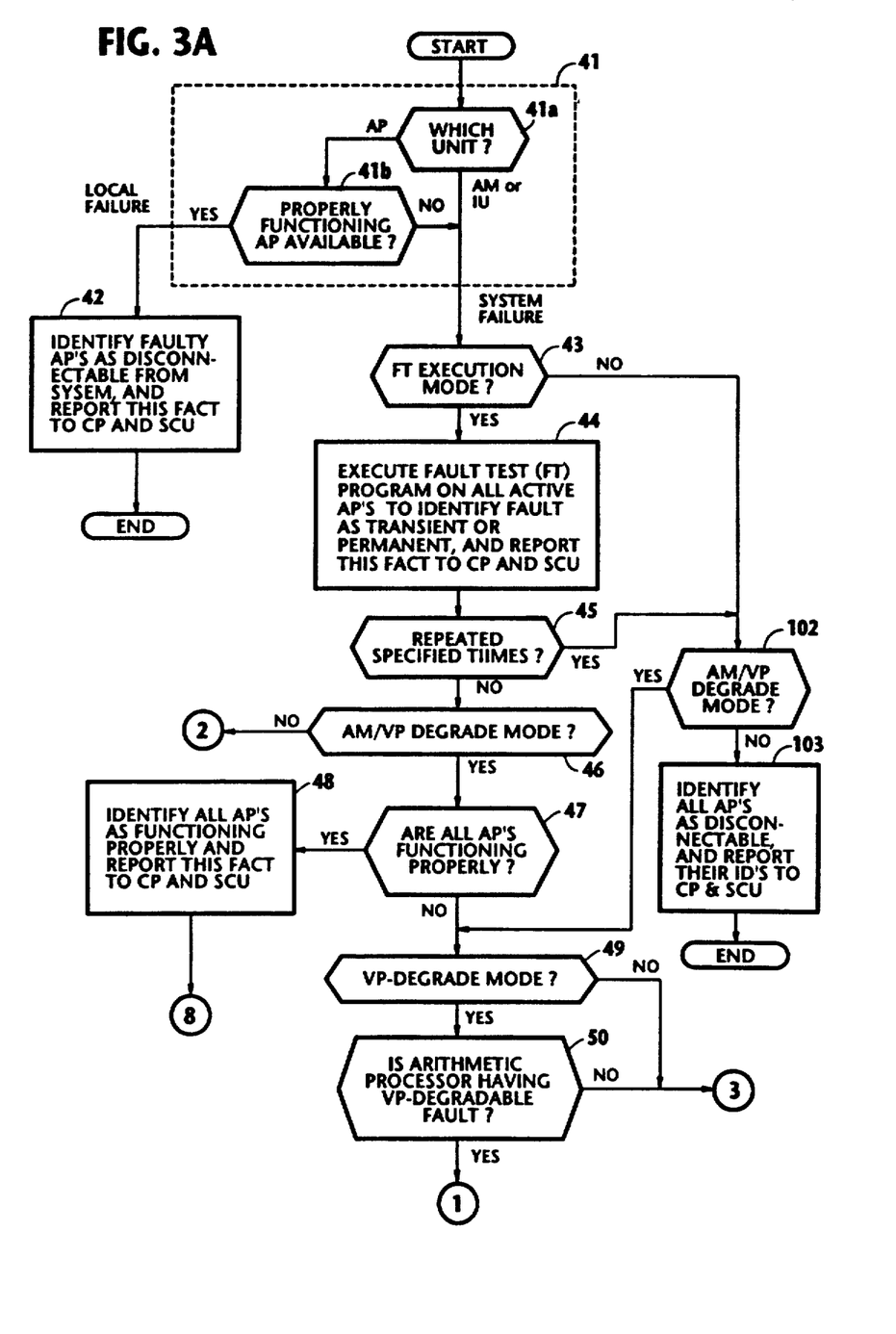
FIGS. 3A to 3F show in flowchart the programmed instructions executed by the fault recovery processor of the present invention.

In FIG. 3A, the fault recovery process begins with a subroutine 41 when a fault report is received from the diagnostics unit 16. If the fault report indicates that a failure has occurred in interface unit 10 or arithmetic memory 12 it is interpreted as a possibly recoverable system failure using the faulty equipment on the assumption that the system can be recovered by isolating the faulty part from the system (step 41a). If the failure is detected in arithmetic processors 15, control exits to step 41b to determine if properly functioning arithmetic processors are still available for proper operation of the system if the faulty arithmetic processor is isolated from the system. If the answer is negative in step 41b, the faulty condition is also recognized as a possibly recoverable system failure. Otherwise, the fault report is recognized as a local failure, and control exits to step 42 to identify the faulty processor and report this fact to control processor 14 and system configuration unit 18 to isolate the faulty arithmetic processor and allow the system to continue operation with the faulty processor being disconnected. If the faulty processor is a master processor, its subordinate processor is also isolated from the system. If there is a user's job being executed by the faulty arithmetic processor or by its subordinate processor, it is aborted.

When such a local failure occurs, the system operation continues when the error report is received from the diagnostics unit. Whereas, if a system failure occurs, the system operation has been discontinued as the error report is received to allow the fault recovery processor to analyze the system in a deactivated state.

If the fault is interpreted as a possibly recoverable system failure, control exits to step 43 to check to see if the system generation parameters specify that fault testing program FT is to be performed. If the fault recovery process is so specified that the test program should be executed, control proceeds to step 44 to execute the FT program on all active arithmetic processors which were properly functioning and connected to the system during the time prior to the occurrence of the fault. The results of the executions of the test program indicate whether the fault is a transient (nonrepeatable) or permanent system fault and this fact is reported to control processor 14.

Exit then is to step 45 to check to see if the fault testing program is as many times repeated as specified. Specifically, the system generation parameters specify eight FT executions within eight hours as a decision threshold to determine if the fault is of transient or permanent nature. If this threshold is not exceeded, the fault is identified as a permanent system fault, and control exits to step 46 to check to see if the fault recovery process is so specified to perform the AM/VP degrade mode. If the answer is negative, control advances to step 86 (FIG. 3E) and, if affirmative, proceeds to step 47 to check to see if the results of FT executions indicate that all the active arithmetic processors are functioning properly. If the answer is affirmative, control exits to step 48 to determine that the fault is a transient system failure and identify all the active arithmetic processors as "valid" (connectable to the system), and report this fact to control processor 14 and SCU 18. When this occurs, control exits to step 101 (FIG. 3F) to restart the system with all the active arithmetic processors connected.

If negative decision is made in step 43 or affirmative decision is made in step 45, control moves to step 102 to check to see if the AM/VP degrade mode is specified by the system generation parameters. If the answer is negative, exit is to step 103 to identify all arithmetic processors as disconnectable from the system and report this fact to CP 14 and SCU 18, and the recovery process is terminated.

Figure 3B:
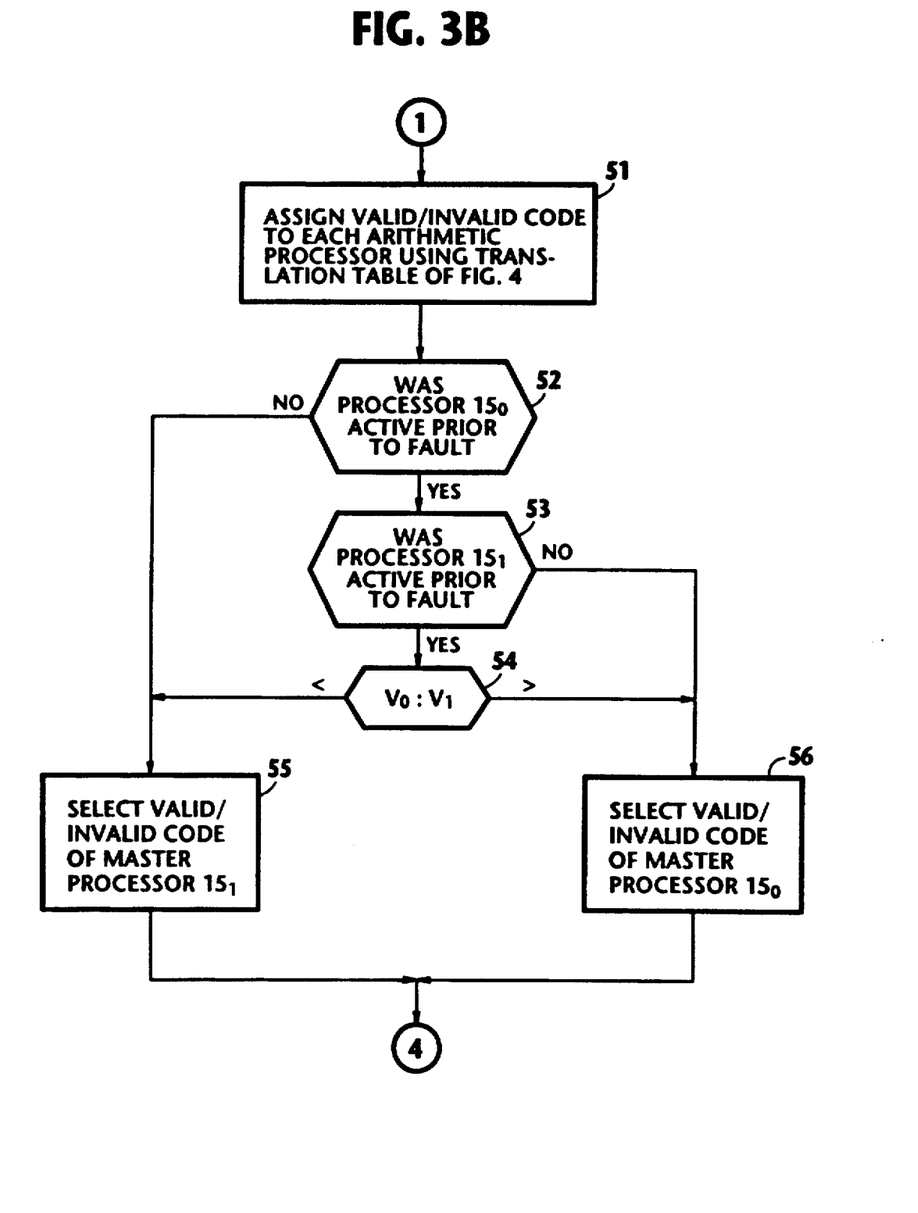
Figure 3C:
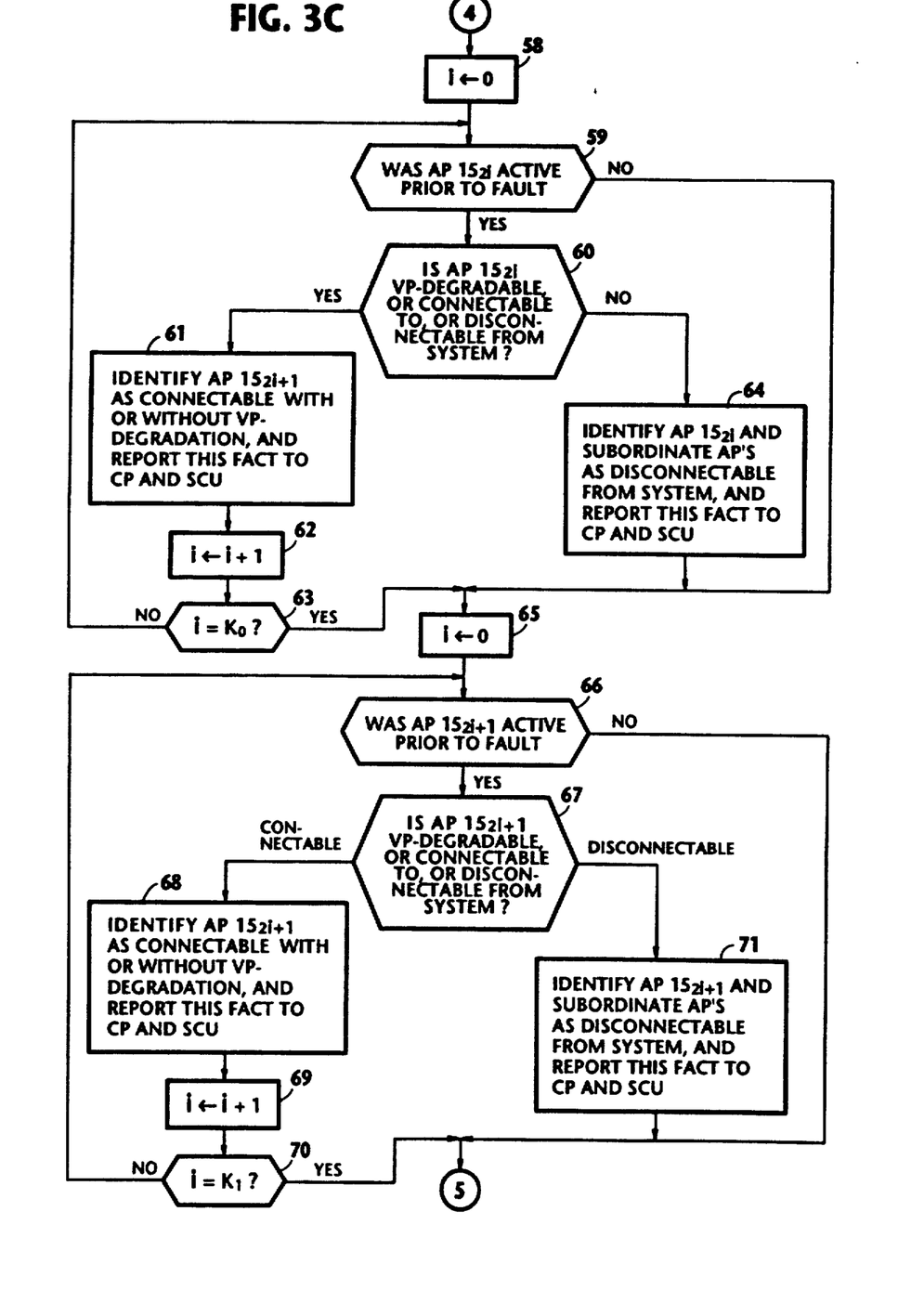
Figure 3D:
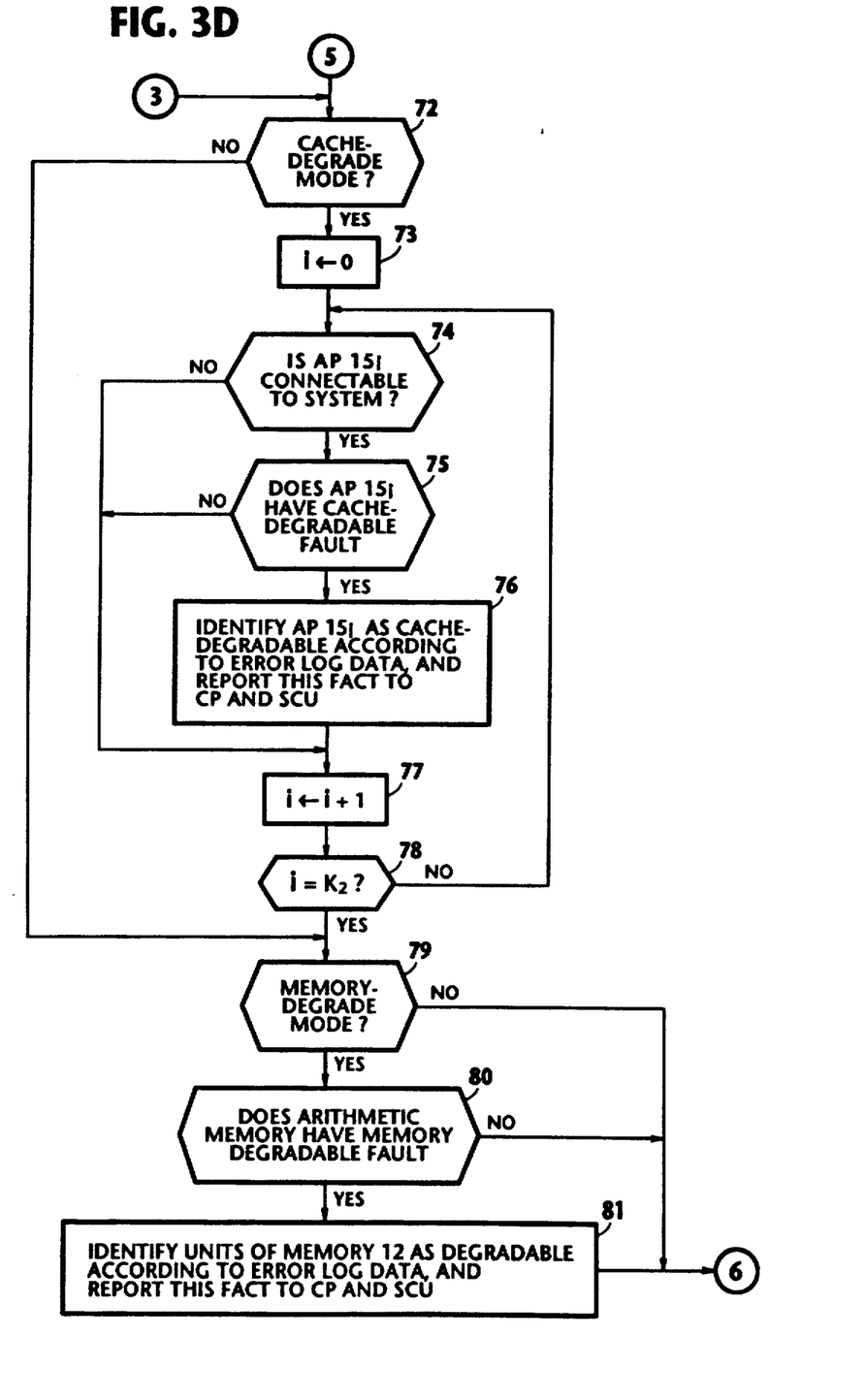

If negative decision is made in step 47 or affirmative decision is made in step 102, control exits to step 49 to check to see if the fault recovery process is specified to perform the VP (vector pipeline)-degrade mode. If the answer is negative, control advances to step 72 (FIG.

Figure 4:
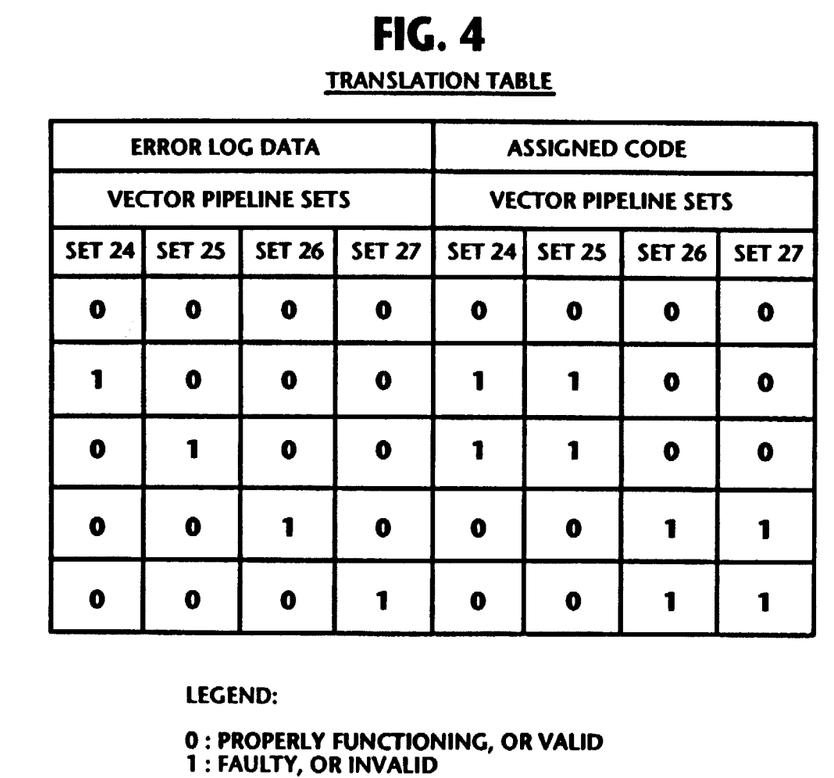
FIG. 4 is an illustration of a translation table for assigning a valid/invalid code to each arithmetic processor to perform vector pipeline degradation.

3D) and, if affirmative, proceeds to step 50 to check to see if there is an arithmetic processor having a VP-degradable fault. If there is none control advances to step 72 (FIG. 3D) and if there is one, exit is to step 51 (FIG. 3B) to assign one of valid/invalid codes to each arithmetic processor according to the error log data of the processor using a VP-degrade translation table shown in FIG. 4. In FIG. 4, vector pipeline sets 24 to 27 of each processor are indicated by the error log data which is derived by step 44. Properly functioning vector pipeline sets are marked by a valid tag (binary 0) and faulty pipeline sets are marked by an invalid tag (binary 1). It is assumed that one half of the total number of pipeline sets is disabled if one of the sets becomes faulty. Thus, each one of five possible input states is translated into one of three output states. More specifically, if all pipeline sets of a given processor are functioning properly, a valid/invalid code "0000" is assigned to that processor for enabling all sets of the processor. If pipeline set 24 or 25 fails, a code "1100" is assigned for disabling pipeline sets 24 and 25 and enabling sets 26 and 27, and if pipeline set 26 of 27 fails, a code "0011" is assigned for enabling sets 24 and 25 and disabling sets 26 and 27.

Exit then is to step 52 to check to see if even-numbered group master processor $15_0$ was active (connected to the system) during the time prior to the system fault. If the answer is negative, control advances to step 55 to select the valid/invalid code assigned to odd-numbered group master processor $15_1$. If the answer is affirmative in step 52, exit then is to step 53 to check to see if odd-numbered group master processor $15_1$ was active during the time prior to the system fault. If the answer is negative, control advances to step 56 to select the valid/invalid code assigned to even-numbered group master processor $15_0$.

If the answer is affirmative in step 53, exit is to step 54 in which the total number ($V_0$) of vector pipeline sets identified by the translation table as being enabled for even-numbered processors $15_{2i}$ and the total number ($V_1$) of vector pipeline sets identified by the translation table a being enabled for odd-numbered processors $15_{2i+1}$ are counted, and a comparison is made between $V_0$ and V. If $V_0 < V_1$, exit is to step 55, and if $V_0 > V_1$, step 56 is executed.

Control now proceeds to step 58 to initiate a vector-pipeline degrade check routine by setting variable i to zero, and goes to decision step 59 to determine if odd-numbered processor $15_{2i}$ was active before the system fault occurred. If the answer is affirmative, control advances to step 60 to check to see if processor $15_{2i}$ is VP-degradable, or it can be connected to system, or must be disconnected from the system by comparing the code assigned to each processor against the code selected by step 55 or 56. Note that because of the vector pipeline configuration, it is necessary that the same group of arithmetic processors be degraded equally throughout its vector pipelines according to the code assigned to the master processor as long as it indicates degradability (i.e., when master processor code is "0011" or "1100") regardless of the code assigned to the subordinate processor. In other words, the same number of vector pipelines must be disabled in each processor of a given group according to the code assigned to the master processor of that group. On the other hand, if the code assigned to the master processor is all zeros, the subordinate processor cannot be degraded and must be disconnected from the system provided that its assigned code is "0011" or "1100", and it is allowed to remain connected to the system provided that its assigned code is all zeros. The decision made by step 60 takes into account the rule just described.

If the decision in step 60 is "degradable" (i.e., connectable with VP-degradation) or "connectable" without VP-degradation, control moves to step 61 to identify processor $15_{2i}$ according to the decision made by step 60 and report this fact to central processor 14 and SCU 18 to update the error log data. Exit then is to step 62 to increment i by 1, and thence to step 63 to check to see if $i = K_0$ (where $K_0$ is equal to the total number of the even-numbered arithmetic processors plus one). If $i \neq K_0$, control returns to step 59 to repeat the process. If the decision in step 60 is "disconnectable" from the system, step 64 is executed by identifying processor $15_{2i}$ and its subordinate processor as such and reporting this fact to the control processor 14 and SCU 18, updating the error log data.

If $i = K_0$ in step 63 or following step 64, control exits to step 65 in which variable i is again set to zero to proceed steps 66 to 70 on odd-numbered processors in a manner similar to steps 59 to 63.

Specifically, the error log data is checked to determine if processor $15_{2i+1}$ was active before the fault occurred (step 66). If the answer is affirmative, control advances to step 67 to check to see if processor $15_{2i+1}$ is degradable, connectable or disconnectable according to the rule described with reference to step 60. If the decision in step 67 is "degradable" or "connectable", control moves to step 68 to identify processor $15_{2i+1}$ as such and report this fact to central processor 14 and SCU 18 to update the error log data. If the decision in step 67 is "disconnectable", step 71 is executed by identifying processor $15_{2i}$ and its subordinate processor as such and reporting this fact to the control processor 14 and SCU 18, updating the error log data. Following step 68, variable i is incremented by one (step 69) and is compared with $K_1$ (step 70), where $K_1$ is equal to the total number of the odd-numbered arithmetic processors plus one. If $\neq K_1$, control returns to step 66 to repeat the process. If the decision in step 67 is "disconnectable", step 71 is executed by identifying processor $15_{2i+1}$ and its subordinate processor as such and reporting this fact to the control processor 14 and SCU 18 to update the error log data. If $i = K_1$ in step 70 or following step 71, control ends the vector-pipeline degrade check routine and now enters step 72 to initiate a cache degrade check routine.

Assume that all processors $15_0 \sim 15_3$ were active before a system fault occurred and processor $15_2$ is detected as having a VP-degradable fault (step 50). Processor $15_2$ is assigned the valid/invalid code "1100", while other arithmetic processors $15_0$, $15_1$ and $15_3$ are assigned the code "0000" (step 51), and control proceeds through steps 52 and 53. Since vector pipeline sets 24 and 25 of processor $15_2$ should be disabled, the total number of vector pipeline sets available for the even-numbered group is six, while that of pipeline sets for the odd-numbered group is eight. Control determines that $V_0 < V_1$ (step 54) and selects the code "0000" assigned to the master processor $15_1$ as a reference code (step 55). Control proceeds through steps 58, 59 to step 60 in which it compares the code "0000" assigned to processor $15_0$ to the reference code "0000". Control determines that processor $15_0$ is connectable to the system without vector pipelines being degraded (step 61) since the assigned code is all zeros. Variable i is then incremented (step 62) and steps 59 and 60 are repeated so that "disconnectable" decision is made (step 60) because the code assigned to processor $15_2$ differs from the master processor code "0000" code. Thus, processor $15_2$ is identified as disconnectable from the system (step 64). It will be seen that as control proceeds through steps 65 to 70, processors $15_1$ and $15_3$ are identified as connectable to the system without vector pipelines being degraded since their assigned codes "0000" match the master processor code. Therefore, when the system is restarted in a later stage of the fault recovery process, processor $15_0$ will be disconnected from the system and the operation will be resumed with the other processors.

If the fault recovery process is specified to perform the cache degrade mode, variable i is set to 0 again (step 73) and control moves to step 74 to examine the error log data to determine if processor $15_i$ is identified as being connectable to the system. If the answer is affirmative, exit is to step 75 to analyze the error log data to determine if processor $15_i$ has a cache degradable fault. If there is one, control proceeds to step 76 to identify one of the two levels of its cache memory as disconnectable from the system depending on the error log data. Variable i is then incremented by one (step 77) and compared with $K_2$ (where $K_2$ is equal to the total number of the arithmetic processors of all groups plus one). If $i \neq K_2$, steps 74 to 77 are repeated. Otherwise, control enters a memory degrade check routine. If the answer is negative in step 72, steps 73 to 78 are skipped and control enters the memory degrade check routine.

If the memory degrade mode is specified by the system generation parameters, control moves to step 80 to analyze the error log data to determine if arithmetic memory 12 has a memory degradable fault. If the answer is affirmative, step 81 is executed by identifying four of the eight constituent units of memory 12 as disconnectable from the system and report this fact to control processor 14 and SCU 18, updating the error log data.

If the decisions in steps 79 and 80 are negative, or step 81 is executed, control proceeds to decision step 82 to check for the presence of at least one constituent unit of the system which is identified as being degradable and check for the presence of an arithmetic processor which has a nondegradable fault. If the answer is negative, control exits to step 93 to identify the arithmetic processors of all groups as disconnectable from the system and report this fact to central processor 14 and SCU 18, updating the error log data and terminating the fault recovery process.

If the answer is affirmative in step 82, control proceeds to step 83 to check to see if the fault recovery process involves the auto-restart mode. If the answer is affirmative, exit is to step 84 to check to see if the auto-restart was repeated a number of times exceeding a specified limit. If the answer is negative, control proceeds to step 85 to examine the error log data and execute the test program on all arithmetic processors which are identified by the error log data as connectable to the system.

If negative decision is made in step 83 or affirmative decision is made in step 84, step 93 is executed to end the fault recovery program.

Figure 3E:
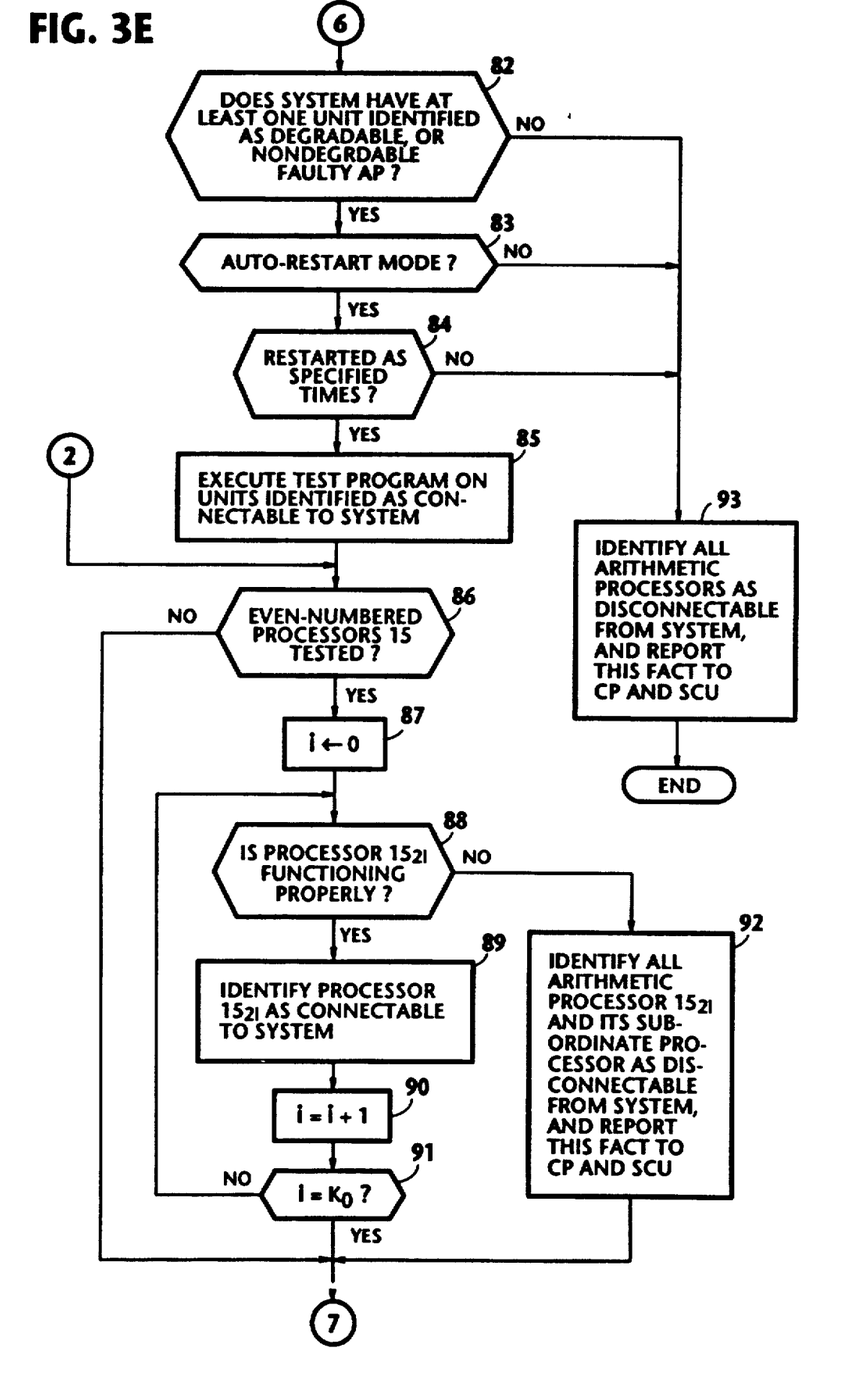

If all even-numbered processors $15_{2i}$ are checked as having being tested (step 86), variable i is reset to zero (step 87) and processor $15_{2i}$ is checked to see if it is functioning properly (step 88). If it is not, control exits to step 92 to identify processor $15_{2i}$ and its subordinate processor as disconnectable from the system and report this fact to central processor 14 and SCU 18, updating the error log data.

If processor $15_{2i}$ is functioning properly, control exits to step 89 to identify processor $15_{2i}$ as connectable to the system. Variable i is then incremented by one (step 90) and compared with $K_0$. If $i \neq K_0$, control returns to step 88 to repeat the process.

Figure 3F:
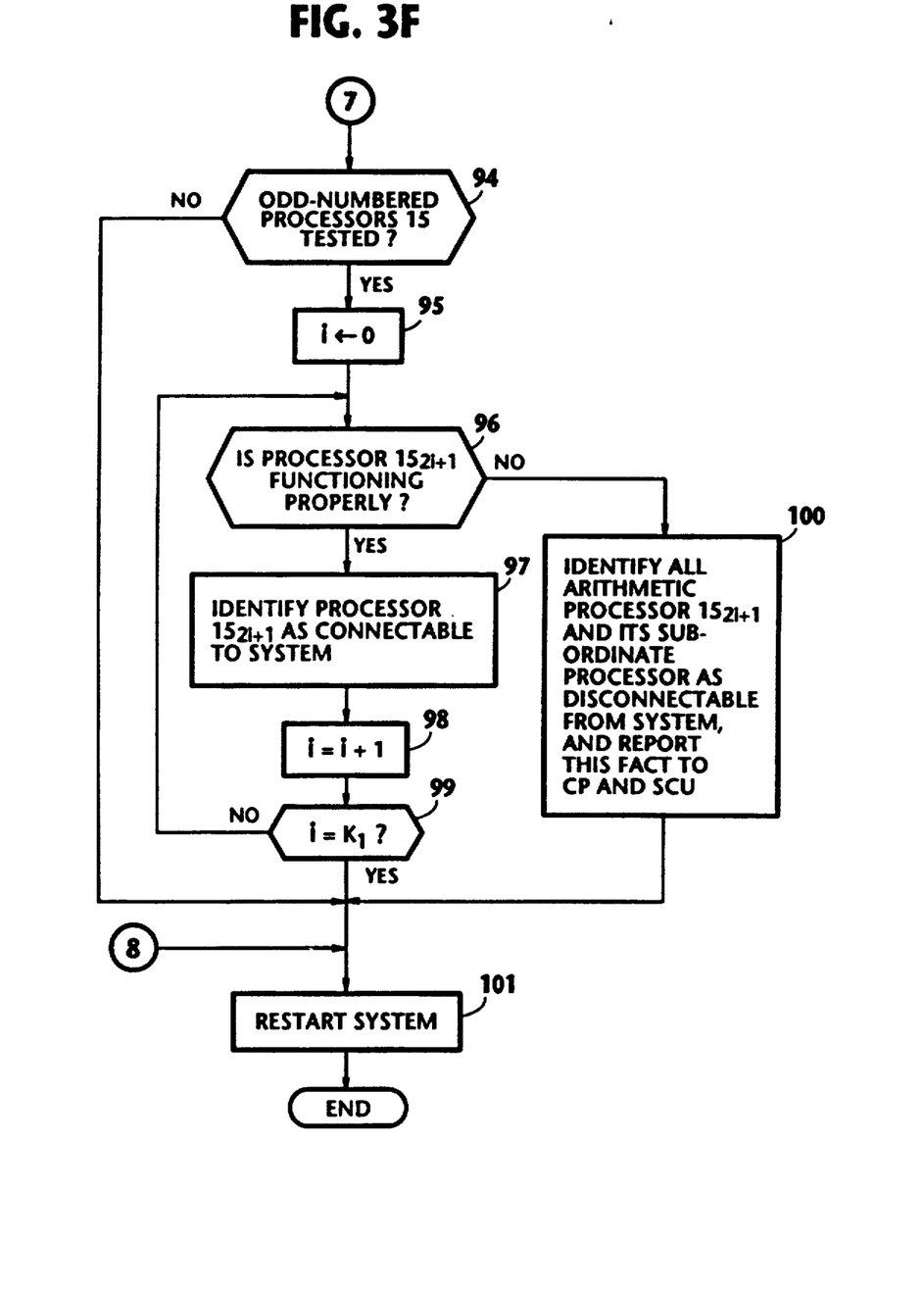

If $i = K_0$, steps 94 to 100 are executed in a manner similar to steps 86 to 92. If all odd-numbered processors $15_{2i+1}$ are checked as having being tested (step 94), variable i is reset to zero (step 95) and processor $15_{2i+1}$ is checked to see if it is functioning properly (step 96). If it is not, control exits to step 100 to identify processor $15_{2i+1}$ and its subordinate processor as disconnectable from the system and report this fact to central processor 14 and SCU 18, updating the error log data. If processor $15_{2i+1}$ is functioning properly, control exits to step 97 to identify processor $15_{2i+1}$ as connectable to the system. Variable i is then incremented by one (step 98) and compared with $K_1$. If $i \neq K_1$, control returns to step 96 to repeat the process.

Step 101 is then executed to restart the system in a configuration according to the error log data.

Figure 5:
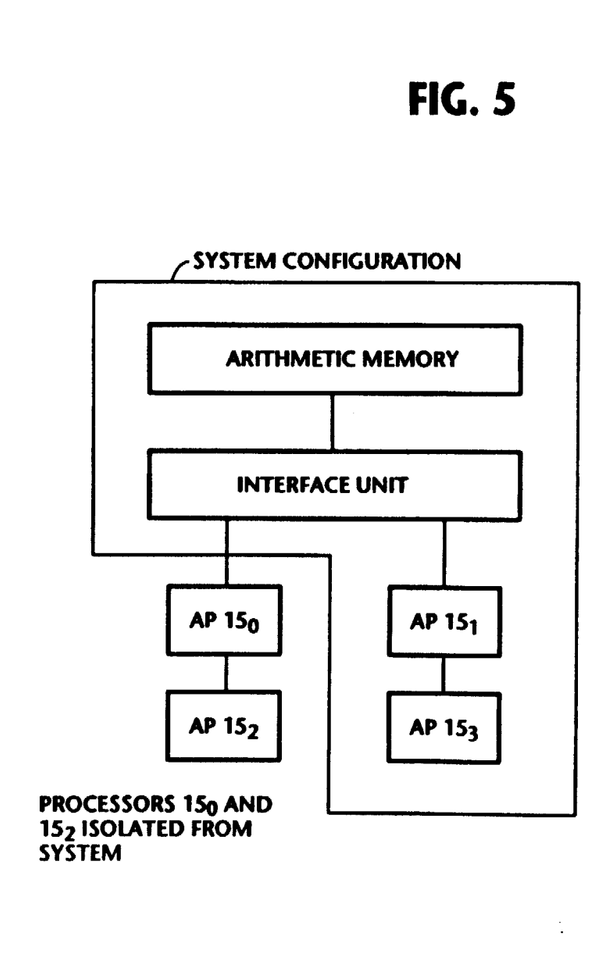
FIG. 5 schematically shows a computer system reconfigured in accordance with various system failures.

The overall operation of the fault recovery process will be better understood with reference to FIG. 5. Assume that the system is operated with even-numbered processors $15_0$ and $15_2$ being disconnected from the system and a fault occurs in one or both processors $15_1$ and $15_3$. It is further assumed that the fault recovery program is set to execute all of its operating modes. The following cases are possible:

CASE 1

If the execution of test program (Ft) reveals that the fault is a VP-degradable fault in the pipeline set 27 of processor $15_1$, which leads to a system fault. In this case, the following items are executed in sequence:

(1) Step 41 (affirmative decision)
(2) Step 43 (affirmative decision)
(3) Step 44 (FT execution)
(4) Step 45 (negative decision)
(5) Step 46 (affirmative decision)
(6) Step 47 (negative decision)
(7) Step 49 (affirmative decision)
(8) Step 50 (affirmative decision)
(9) Step 51 (code "0011" is assigned to processor $15_1$ and code "0000" is assigned to processor $15_3$)
(10) Step 52 (negative decision)
(11) Step 55 (code "0011" is selected as a reference)
(12) Step 58 (i=0)
(13) Step 59 (negative decision)
(14) Step 65 (i=0)
(15) Step 66 (affirmative decision)
(16) Step 67 ("degradable" decision since the reference code is "0011")
(17) Step 68 (processor $15_1$ is identified as connectable with its vector pipelines being degraded)
(18) Step 69 (i=i+1)
(19) Step 70 (negative decision)
(20) Step 66 (affirmative decision)
(21) Step 67 ("degradable" decision is made)
(22) Step 68 (report is made that processor $15_1$ is identified as "degradable" and error log data is updated accordingly)
(23) Step 69 (i=i+1)
(24) Step 70 (affirmative decision)
(25) Step 72 (affirmative decision)

(26) Step 73 (i=0)
(27) Step 74 (negative decision indicating that processor $15_0$ cannot be connected to the system)
(28) Step 77 (i=i+1)
(29) Step 78 (negative decision)
(30) Step 74 (affirmative decision indicating that processor $15_1$ can be connected to the system)
(31) Step 75 (negative decision)
(32) Step 77 (i=i+1)
(33) Step 78 (affirmative decision)
(34) Step 74 (negative decision indicating that processor $15_2$ cannot be connected to the system)
(35) Step 77 (i=i+1)
(36) Step 78 (negative decision)
(37) Step 74 (affirmative decision indicating that processor $15_3$ can be connected to the system)
(38) Step 75 (negative decision)
(39) Step 77 (i=i+1)
(40) Step 78 (affirmative decision)
(41) Step 79 (affirmative decision)
(42) Step 80 (negative decision)
(43) Step 82 (affirmative decision)
(44) Step 83 (affirmative decision)
(45) Step 84 (negative decision)
(46) Step 85 (FT execution)
(47) Step 86 (negative decision)
(48) Step 94 (affirmative decision)
(49) Step 95 (i=0)
(50) Step 96 (affirmative decision indicating that processor $15_1$ is functioning properly)
(51) Step 97 (processor $15_1$ is identified as being connectable to the system)
(52) Step 98 (i=i+1)
(53) Step 99 (negative decision)
(54) Step 96 (affirmative decision indicating that processor $15_3$ is functioning properly)
(55) Step 97 (processor $15_3$ is identified as being connectable to the system)
(56) Step 98 (i=i+1)
(57) Step 99 (affirmative decision)
(58) Step 101 (system is restarted with processors $15_1$ and $15_3$ being connected with their vector pipeline sets degraded)

CASE 2

If the execution of test program (Ft) reveals that the fault is a VP-degradable fault in the pipeline set 24 of processor $15_3$, which leads to a system fault. In this case, the following items are executed:
(1) Step 41 (affirmative decision)
(2) Step 43 (affirmative decision)
(3) Step 44 (FT execution)
(4) Step 45 (negative decision)
(5) Step 46 (affirmative decision)
(6) Step 47 (negative decision)
(7) Step 49 (affirmative decision)
(8) Step 50 (affirmative decision)
(9) Step 51 (code "0000" is assigned to processor $15_1$ and code "1100" is assigned to processor $15_3$)
(10) Step 52 (negative decision)
(11) Step 55 (code "0000" is selected as a reference code)
(12) Step 58 (i=0)
(13) Step 59 (negative decision)
(14) Step 65 (i=0)
(15) Step 66 (affirmative decision)
(16) Step 67 ("connectable" decision since both reference code and the code assigned to processor $15_1$ are "0000")
(17) Step 68 (processor $15_1$ is identified as connectable without vector pipeline degradation)
(18) Step 69 (i=i+1)
(19) Step 70 (negative decision)
(20) Step 66 (affirmative decision)
(21) Step 67 ("disconnectable" decision is made on processor $15_3$ since the reference code is "0000", but the code assigned to processor $15_3$ is "1100")
(22) Step 71 (report is made that processor $15_3$ is identified as "disconnectable" and error log data is updated accordingly)
(23) Step 72 (affirmative decision)
(24) Step 73 (i=0)
(25) Step 74 (negative decision indicating that processor $15_0$ cannot be connected to the system)
(26) Step 77 (i=i+1)
(27) Step 78 (negative decision)
(28) Step 74 (affirmative decision indicating that processor $15_1$ can be connected to the system)
(29) Step 75 (negative decision)
(30) Step 77 (i=i+1)
(31) Step 78 (affirmative decision)
(32) Step 74 (negative decision indicating that processor $15_2$ cannot be connected to the system)
(33) Step 77 (i=i+1)
(34) Step 78 (negative decision)
(35) Step 74 (affirmative decision indicating that processor $15_3$ can be connected to the system)
(36) Step 75 (negative decision)
(37) Step 77 (i=i+1)
(38) Step 78 (affirmative decision)
(39) Step 79 (affirmative decision)
(40) Step 80 (negative decision)
(41) Step 82 (affirmative decision)
(42) Step 83 (affirmative decision)
(43) Step 84 (negative decision)
(44) Step 85 (FT execution)
(45) Step 86 (negative decision)
(46) Step 94 (affirmative decision)
(47) Step 95 (i=0)
(48) Step 96 (affirmative decision indicating that processor $15_1$ is functioning properly)
(49) Step 97 (processor $15_1$ is identified as being connectable to the system)
(50) Step 98 (i=i+1)
(51) Step 99 (negative decision)
(52) Step 96 (negative decision indicating that processor $15_3$ is not functioning properly)
(53) Step 100 (processor $15_3$ is identified as "disconnectable")
(54) Step 101 (system is restarted with processor $15_1$ being connected without degradation and processor $15_3$ being disconnected)

CASE 3

If the execution of test program (Ft) reveals that processor $15_1$ has a transient fault. In this case, the following items are executed:
(1) Step 41 (affirmative decision)
(2) Step 43 (affirmative decision)
(3) Step 44 (FT execution)
(4) Step 45 (negative decision)
(5) Step 46 (affirmative decision)
(6) Step 47 (affirmative decision)

(7) Step 48 (processors $15_1$ and $15_3$ are identified as functioning properly)
(8) Step 101 (system is restarted with processors $15_1$ and $15_3$ being connected)

CASE 4

If the execution of test program (Ft) reveals that processor $15_3$ has a permanent fault of nondegradable type. In this case, the following items are executed:

(1) Step 41 (affirmative decision)
(2) Step 43 (affirmative decision)
(3) Step 44 (FT execution)
(4) Step 45 (negative decision)
(5) Step 46 (affirmative decision)
(6) Step 47 (negative decision)
(7) Step 49 (affirmative decision)
(8) Step 50 (negative decision)
(9) Step 72 (affirmative decision)
(10) Step 73 (i=0)
(11) Step 74 (negative decision indicating that processor $15_0$ cannot be connected to the system)
(12) Step 77 (i=i+1)
(13) Step 78 (negative decision)
(14) Step 74 (affirmative decision indicating that processor $15_1$ can be connected to the system)
(15) Step 75 (negative decision)
(16) Step 77 (i=i+1)
(17) Step 78 (affirmative decision)
(18) Step 74 (negative decision indicating that processor $15_2$ cannot be connected to the system)
(19) Step 77 (i=i+1)
(20) Step 78 (negative decision)
(21) Step 74 (affirmative decision indicating that processor $15_3$ can be connected to the system)
(22) Step 75 (negative decision)
(23) Step 77 (i=i+1)
(24) Step 78 (affirmative decision)
(25) Step 79 (affirmative decision)
(26) Step 80 (affirmative decision)
(27) Step 82 (affirmative decision)
(28) Step 83 (affirmative decision)
(29) Step 84 (negative decision)
(30) Step 85 (FT execution)
(31) Step 86 (negative decision)
(32) Step 94 (affirmative decision)
(33) Step 95 (i=0)
(34) Step 96 (affirmative decision indicating that processor $15_1$ is functioning properly)
(35) Step 97 (processor $15_1$ is identified as being connectable to the system)
(36) Step 98 (i=i+1)
(37) Step 99 (negative decision)
(38) Step 96 (negative decision indicating that processor $15_3$ is not functioning properly)
(39) Step 100 (processor $15_3$ is identified as "disconnectable")
(40) Step 101 (system is restarted with processor $15_1$ being connected without degradation and processor $15_3$ being disconnected)

CASE 5

If the execution of test program (Ft) reveals that processor $15_1$ has a permanent fault of nondegradable type. In this case, the following items are executed:

(1) Step 41 (affirmative decision)
(2) Step 43 (affirmative decision)
(3) Step 44 (FT execution)
(4) Step 45 (negative decision)
(5) Step 46 (affirmative decision)
(6) Step 47 (negative decision)
(7) Step 49 (affirmative decision)
(8) Step 50 (negative decision)
(9) Step 72 (affirmative decision)
(10) Step 73 (i=0)
(11) Step 74 (negative decision indicating that processor $15_0$ cannot be connected to the system)
(12) Step 77 (i=i+1)
(13) Step 78 (negative decision)
(14) Step 74 (affirmative decision indicating that processor $15_1$ can be connected to the system)
(15) Step 75 (negative decision)
(16) Step 77 (i=i+1)
(17) Step 78 (affirmative decision)
(18) Step 74 (negative decision indicating that processor $15_2$ cannot be connected to the system)
(19) Step 77 (i=i+1)
(20) Step 78 (negative decision)
(21) Step 74 (affirmative decision indicating that processor $15_3$ can be connected to the system)
(22) Step 75 (negative decision)
(23) Step 77 (i=i+1)
(24) Step 78 (affirmative decision)
(25) Step 79 (affirmative decision)
(26) Step 80 (negative decision)
(27) Step 82 (negative decision)
(28) Step 93 (identify processors $15_1$ and $15_3$ as "disconnectable")

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. In a high speed computer having a memory and a plurality of arithmetic processors divided into groups, the arithmetic processors of each group being connected to said memory in hierarchical order in a master-subordinate relationship, said memory and said arithmetic processors generating an alarm signal indicating a failed part of said memory and each of said arithmetic processors, a method for recovering from a fault comprising the steps of:

a) determining whether said computer is in a recoverable state in response to receipt of said alarm signal;
b) if said computer is determined as being in said recoverable state, performing a test program on said computer to determine if said computer is properly functioning;
c) if said computer is determined by step (b) as properly functioning, restarting said computer in an original system configuration;
d) if said computer is determined by the step (b) as not properly functioning, isolating part of said arithmetic processors from said computer depending on said alarm signal to degrade said computer into a first degraded system configuration;
e) performing said test program on said computer in said first degraded system configuration to determine if said computer is properly functioning;
f) if said computer is determined by the step (e) as properly functioning, restarting said computer in said first degraded system configuration; and
g) if said computer is determined by the step (e) as not properly functioning, isolating one or more of said arithmetic processors from said first degraded system configuration depending on said alarm signal so that said computer is degraded into a second degraded system configuration, and restarting said computer in said second degraded system configuration.

2. A method as claimed in claim 1, wherein the step (e) comprises the step ($e_1$) of performing said test program on each of said arithmetic processors and the step (f) isolates the master arithmetic processor of one of said groups as well as a subordinate arithmetic processor of the group from said computer if said master arithmetic processor is determined by the step ($e_1$) as not properly functioning.

3. A method as claimed in claim 2, wherein each of said arithmetic processor includes a plurality of vector pipelines, and wherein the step (d) comprises:

($d_1$) assigning a valid/invalid code to each of said arithmetic processors depending on a result of said test program performed by the step (b), said valid/invalid code identifying each of the arithmetic processors of each group as connectable to the computer or disconnectable from said computer;

($d_2$) comparing between a total number of vector pipelines available for one group of said arithmetic processors and a total number of vector pipelines available for the other group of said arithmetic processors;

($d_3$) selecting the valid/invalid code assigned to the master arithmetic processor of the group which is determined by the step ($d_2$) as having a greater total number of available vector pipelines; and ($d_4$) checking the valid/invalid code assigned to each of said arithmetic processors against said selected valid/invalid code to determine whether the vector pipelines of each of said arithmetic processors are to be isolated from the computer or each of said arithmetic processors is to be isolated as a whole from said computer.

4. A method as claimed in claim 1, wherein each of said arithmetic processors includes a cache memory, and wherein the step (d) isolates part of the cache memory of the arithmetic processor which is reported as faulty with said alarm signal.

5. A method as claimed in claim 1, wherein the step (d) disables part of said memory which is reported as faulty with said alarm signal.

* * * * *